United States Patent
Numata et al.

(10) Patent No.: US 10,593,143 B2
(45) Date of Patent: Mar. 17, 2020

(54) MONEY MANAGEMENT SYSTEM AND MONEY MANAGEMENT METHOD

(71) Applicant: GLORY LTD., Himeji-shi, Hyogo (JP)

(72) Inventors: Toshio Numata, Hyogo (JP); Masaki Inoue, Hyogo (JP)

(73) Assignee: GLORY LTD., Himeji-Shi, Hyogo (JP)

( * ) Notice: Subject to any disclaimer, the term of this patent is extended or adjusted under 35 U.S.C. 154(b) by 52 days.

(21) Appl. No.: 15/759,901

(22) PCT Filed: Sep. 14, 2016

(86) PCT No.: PCT/JP2016/077112
§ 371 (c)(1),
(2) Date: Mar. 14, 2018

(87) PCT Pub. No.: WO2017/047641
PCT Pub. Date: Mar. 23, 2017

(65) Prior Publication Data
US 2018/0247480 A1 Aug. 30, 2018

(30) Foreign Application Priority Data
Sep. 16, 2015 (JP) ................................. 2015-182430

(51) Int. Cl.
*G07D 11/24* (2019.01)
*G07D 11/16* (2019.01)
(Continued)

(52) U.S. Cl.
CPC .......... *G07D 11/24* (2019.01); *G06K 9/00463* (2013.01); *G07D 3/00* (2013.01);
(Continued)

(58) Field of Classification Search
CPC ........ G07D 11/00; G07D 11/16; G07D 11/20; G07D 11/24; G07D 11/30; G07D 11/0087;
(Continued)

(56) References Cited

U.S. PATENT DOCUMENTS

2008/0219543 A1* 9/2008 Csulits ................... G06K 9/033
382/135
2013/0317960 A1* 11/2013 Holl ........................ G06Q 40/00
705/35

FOREIGN PATENT DOCUMENTS

JP     2014-223924 A    12/2014
JP     2015-56010 A     3/2015

OTHER PUBLICATIONS

EPO, Supplementary European Search Report, EP Application No. EP 16 84 6512.8 (European counterpart to subject U.S. Appl. No. 15/759,901), 8 pages, dated Jun. 19, 2019.

* cited by examiner

*Primary Examiner* — Mark J Beauchaine
(74) *Attorney, Agent, or Firm* — Renner Kenner Greive Bobak Taylor and Weber; Tim Hodgkiss; Edward Greive (57) ABSTRACT

One object is to easily manage a large number of banknotes. A money management system includes a banknote handling apparatus having a serial number reading unit that reads a serial number of each banknote to be grouped, and a management server having a control unit that manages by grouping the serial numbers read by the serial number reading unit, receives an input of a target serial number, identifies a target group containing the target serial number from among the groups and outputs the serial numbers of all the banknotes belonging to the target group.

8 Claims, 6 Drawing Sheets

(51) Int. Cl.
    *G07D 3/00*           (2006.01)
    *G07D 9/00*           (2006.01)
    *G07D 11/30*         (2019.01)
    *G06K 9/00*           (2006.01)

(52) U.S. Cl.
    CPC ............... *G07D 9/00* (2013.01); *G07D 11/16* (2019.01); *G07D 11/30* (2019.01)

(58) Field of Classification Search
    CPC ........ G07D 2211/00; G07D 3/00; G07D 9/00; G06K 9/00
    See application file for complete search history.

| GROUP CODE | DATE AND TIME OF CREATION | HANDLING NUMBER | DEVICE ID | BUNDLE ID | AMOUNT | STORAGE CONTAINER ID | SERIAL NUMBER |
|---|---|---|---|---|---|---|---|
| 20150702132201001 | 2015/07/02 13:22 | 001 | 101 | 0001 ~ 0020 | 1000-JPY NOTE 2000 NOTES | C001 | A0001 B0004 C0012 ... |
| 20150702142401002 | 2015/07/02 14:24 | 002 | 101 | 0021 ~ 0025 | 1000-JPY NOTE 400 NOTES 5000-JPY NOTE 100 NOTES | B001 | X0007 Z0011 Y0005 ... |
| ... | | | | | | | |

MONEY MANAGEMENT SYSTEM AND MONEY MANAGEMENT METHOD

TECHNICAL FIELD

The present invention relates to a money management system and a money management method for managing a large number of piece of money.

BACKGROUND ART

A serial number printed on a banknote is used to manage the banknote. For example, Patent Document 1 discloses a money management system that reads a serial number from each of a plurality of banknotes, creates one management code for all the serial numbers, and manages the banknotes by affixing to the banknotes a management tag on which the management code has been printed. The loose banknotes from which the serial numbers have been read are bundled by using a rubber band, for example, and kept as is after affixing the management tag thereto. When carrying these loose banknotes, the loose banknotes are stored in storage containers, such as a cassette or a bag, and the management code printed on the management tag affixed to the loose banknotes is read. The read management code is associated with a storage container ID, which is an ID to identify each of the storage containers, to manage the banknotes. Thus, the management code can be identified from the storage container ID affixed to the storage container, and the serial numbers of all the banknotes stored in the storage container can be identified from the identified management code. When bundling a predetermined number of banknotes by using a bundling tape, by printing the management code on the bundling tape, the serial numbers of all the banknotes included in the banknote bundle can be associated with the same management code to manage the banknote bundle.

CITATION LIST

Patent Document

[Patent Document 1] Japanese Patent Application Laid-Open No. 2015-56010

SUMMARY OF INVENTION

Technical Problem

However, in the conventional technique, when managing the loose banknotes, a printer is necessary to print the management code on the management tag. Also, when managing the banknote bundle, a printer is necessary to print the management code on the banknote bundle. Moreover, while the loose banknotes are kept as is, the management code printed on the management tag may be damaged or soiled whereby the management code cannot be read, or the management tag itself may be lost. If this happens, the serial number of the banknotes might not be identified. Similarly, while the banknote bundle is kept as is, the bundling tape may be damaged or soiled whereby the management code cannot be read because, or the bundling tape itself may be torn and lost. If this happens, the serial number of the banknotes might not be identified.

The present invention is made to address the problems in the conventional technology. One object of the present invention is to provide a money management system and a money management method capable of easily managing a large number of banknotes without a need to newly provide a printer and the like to print a management code.

Means for Solving Problems

To solve the above problems and to achieve the above object, a money management system according to one aspect of the present invention includes a serial number reading unit that reads a serial number of each banknote to be grouped; and a control unit that forms a group of a plurality of serial numbers read by the serial number reading unit, receives an input of a target serial number, identifies a target group containing the target serial number from among groups and identifies serial numbers of all banknotes belonging to the target group.

In the above money management system, the control unit associates a group code with the plurality of serial numbers of the banknotes to be grouped, receives an input of a target group code, identifies the plurality of serial numbers associated with the target group code from among the groups and identifies the serial numbers of all grouped banknotes.

The above money management system further includes an operation unit for specifying the banknotes to be grouped; and a banknote handling unit that performs recognition and counting of the banknotes to be grouped. When a denomination and the number of banknotes, whose serial numbers are to be grouped, are input by using the operation unit, the banknote handling unit determines whether each of the banknotes are to belong to a specified group, the serial number reading unit reads the serial numbers of the banknotes determined to belong to the specified group, and the control unit groups the serial numbers read by the serial number reading unit.

The above money management system further includes an operation unit for specifying the banknotes to be grouped. When an instruction to start a grouping process and an instruction to end the grouping process are input by using the operation unit, the control unit groups the plurality of serial numbers read by the serial number reading unit within a time period from a time point at which an instruction to start the grouping process is received to a time point at which an instruction to end the grouping process is received.

In the above money management system, the control unit associates the plurality of serial numbers of grouped banknotes with storage container information indicating a storage container in which the grouped banknotes are stored.

A money management system according to another aspect of the present invention includes a banknote handling apparatus that performs recognition and counting of each banknote to be grouped and reads a serial number of the each banknote to be grouped; and a management server that acquires from the banknote handling apparatus serial numbers read by the banknote handling apparatus and manages read serial numbers by group, receives an input of a target serial number of one banknote taken out from a group of banknotes prepared for storage in a banknote storage container, identifies a target group containing the target serial number from among managed groups and identifies serial numbers of all the banknotes for storage in the banknote storage container.

A money management method according to still another aspect of the present invention includes reading by a banknote handling apparatus a serial number of each banknote to be grouped; managing the serial numbers, by a management server, by grouping a plurality of serial numbers; inputting a target serial number in the management server; and identifying a target group containing the target serial number from among groups managed in the management server and identifying serial numbers of all the banknotes belonging to the target group.

A money management method according to still another aspect of the present invention includes performing recognition and counting of each of grouped banknotes to be grouped and reading a serial number of the each banknote by a banknote handling apparatus; acquiring from the banknote handling apparatus read serial numbers and managing received serial numbers by group by a management server; inputting-a target serial number of one banknote taken out from a group of banknotes prepared for storage in a banknote storage container; and identifying a target group containing the target serial number from among groups managed in the management server and identifying serial numbers of all banknotes for storage in the banknote storage container.

Advantageous Effects of Invention

According to the present invention, by using the money management system, the serial numbers read from a plurality of banknotes are managed by grouping. As a result, by using one serial number, the group that contains the one serial number can be identified whereby the serial numbers of all the banknotes whose serial numbers were grouped can be identified. In a bank or a cash center, for example, a large number of banknotes to be handled are managed by grouping. When reusing the handled banknotes, based on a serial number read from one banknote, the serial numbers of all the banknotes in the group to which the one banknote belongs can be identified. Because the serial number printed on the banknote is used, there is no need to create a management code to manage the grouped banknotes, and print the management code on a management tag and affix the management tag to a banknote bundle, or print the management code on a bundling tape of the banknote bundle. Therefore, a large number of banknotes can be easily managed.

DESCRIPTION OF EMBODIMENTS

Exemplary embodiments of a money management system and a money management method according to the present invention are explained below in detail with reference to the accompanying drawings. The money management system according to the present embodiment can be used to manage many banknotes at various places such as in a financial institution such as a bank, a cash center in which a large number of banknotes is handled, a large-scale retail shop, and the like. In the following, the money management system capable of managing banknotes to be carried from a bank head office to a bank branch office is explained as an example.

Figure 1:
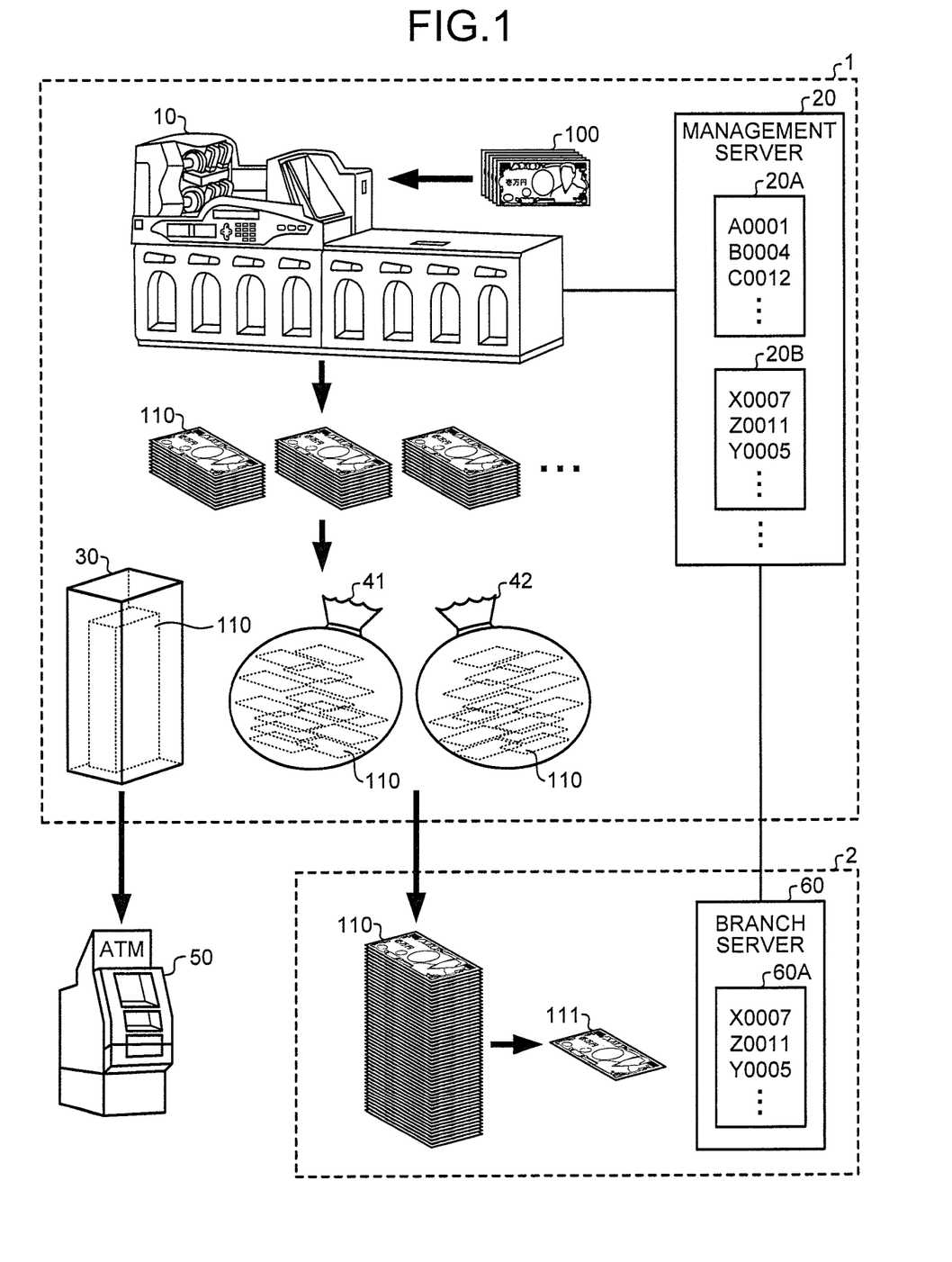
FIG. 1 is a schematic diagram for explaining a money management method realized in a money management system according to the present embodiment.

FIG. 1 is a schematic diagram for explaining a money management method realized in the money management system according to the present embodiment. The money management system includes a banknote handling apparatus 10 that reads a serial number of banknotes, a management server 20 that manages information about the banknotes handled in the banknote handling apparatus 10, and a branch server 60 that uses the information managed in the management server 20. Note that, the number of the banknote handling apparatuses 10 connected communicably to the management server 20 is not particularly limited. Even if a plurality of the banknote handling apparatuses 10 is connected, because similar processing is carried in each of the banknote handling apparatuses 10, an example using one banknote handling apparatus 10 is explained below.

The banknote handling apparatus 10 and the management server 20 are installed in a bank head office 1 and the branch server 60 is installed in a bank branch office 2. In the bank head office 1, the banknotes for use in an ATM (automatic teller machine) 50 and the banknotes for use in the bank branch office 2 are prepared by using the banknote handling apparatus 10. Specifically, the banknotes for use in the ATM 50 are put in an ATM cassette 30, and the ATM cassette 30 is carried to an installation location of the ATM 50 and mounted in the ATM 50. The banknotes for use in the bank branch office 2 are put in banknote storage pouches 41 and 42, and the banknote storage pouches 41 and 42 are carried to the bank branch office 2. However, if it is possible to carry a large number of banknotes, the method of carrying the banknotes is not particularly limited. Other than the cassette and the banknote storage pouch, for example, the banknotes can be transported by putting them in a bag or in a small safe.

The banknote handling apparatus 10 has a function to take in, one by one, a plurality of banknotes 100 put on a receiving unit to a transport path arranged in the apparatus The banknote handling apparatus 10 also has functions to recognize a denomination, authenticity, fitness, and the like of the banknote by using a recognition unit arranged in the transport path, and to sort and stack the banknotes by type by using a plurality of stacking units. A banknote that cannot be recognized by the recognition unit, a banknote that is recognized as a fake banknote (counterfeit note), a banknote that is recognized as being suspected of the counterfeit note (suspect banknote), a banknote that is judged based on previously set standards to be too damaged or too soiled to the extent that this banknote cannot be used (unfit note), and the like are rejected in a reject unit. That is, only normal banknotes that can be used in the ATM 50 and normal banknotes that can be used in the bank branch office 2 are stacked in the stacking units of the banknote handling apparatus 10.

The banknote handling apparatus 10 has functions to read by using the recognition unit a serial number printed on the banknote, and to output the read serial number to the management server 20. The serial number is an identification number specific to each banknote and it is printed on the banknote to identify each banknote. Even if the banknotes of the same denomination exist, such banknotes can be distinguished based on the serial number of each banknote. As far as a function to read the serial number of the banknote and to output the read serial number is included, the functions and the structure of the banknote handling apparatus 10 are not particularly limited. For example, the banknote handling apparatus 10 can include a bundling unit for bundling a predetermined number of the banknotes, or the banknote handling apparatus 10 can handle coins in addition to the banknotes. Banknote handling such as banknote recognition, serial number reading, sorting and stacking, bundling, and the like can be performed by using the known techniques so that a detailed explanation thereof will be omitted herefrom.

Each of the management server 20 and the branch server 60 is a computer and the like. The management server 20 installed in the bank head office 1 has functions to receive information such as the serial numbers and the like of the banknotes grouped in the banknote handling apparatus 10, and to store the received information in a nonvolatile memory such as a hard disk to manage the information. The branch server 60 installed in the bank branch office 2 has functions to communicate with the management server 20 installed in the bank head office 1 via a public communication network or a dedicated communication network, and to use the information managed in the management server 20.

Each of the stacking units of the banknote handling apparatus 10 has an opening from which the banknote stacked therein can be removed. When performing a batch processing to stack a predetermined number of banknotes, the number of which is previously set as a batch number (for example, 100), in each of the stacking units, stacking of the banknotes is stopped in the stacking unit in which the number of stacked banknotes has reached the batch number. When stacking the banknotes in each of the stacking units until the stacking unit becomes full state, in which the number of stacked banknotes has reached the full number (for example, 500), the stacking of the banknotes is stopped in the stacking unit that has become full. The banknotes are removed from the stacking unit in which the stacking of the banknotes has been stopped. As shown in FIG. 1, the removed banknotes 110 are grouped and held in safekeeping by group.

The banknotes obtained from the stacking unit in one removal operation are grouped in one group. Alternatively, the banknotes obtained from the stacking unit in more than one removal operations are grouped in one group. For example, after the banknotes are stacked in the stacking unit until the number of stacked banknotes reaches the batch number, the stacked banknotes are removed from the stacking unit and grouped in one group. Alternatively, after the banknotes are stacked in the stacking unit until the stacking unit becomes full, the stacked banknotes are removed from the stacking unit and grouped in one group. Moreover, for example, the removal operation of removing from the stacking unit the banknotes whose number has reached the batch number is repeated five times, and those banknotes equal to five times of the batch number (500 banknotes) are grouped in one group. For another example, the removal operation of removing the banknotes equal to the batch number, that is, 100 banknotes, is repeated twenty times, or the removal operation of removing the 500 banknotes from the full state stacking unit are repeated four times, and the like, to group 2000 banknotes in one group.

In the banknote handling apparatus 10, it is possible to specify the type of the banknotes to be grouped. Specifically, for example, after specifying to group two thousand fit 1000-JPY notes in one group, the banknote processing is started. Upon receiving such specification, the banknote handling apparatus 10 feeds, one by one, the banknotes inside the apparatus from the receiving unit, performs recognition and counting of fed banknotes, and reads the serial number of each banknote. When a banknote is a 1000-JPY note recognized as a fit note and the serial number is read from this banknote, the banknote handling apparatus 10 stacks this fit 1000-JPY note in the stacking unit, while rejecting the banknote other than the 1000-JPY note, the banknote that is the 1000-JPY note but from which the serial number could not be read, the banknote that is the 1000-JPY note but that is an unfit note, and the like. When the total number of stacked banknotes reaches two thousand, the stacking of the banknote in the stacking unit is stopped. A user removes stacked two thousand banknotes from the stacking unit and keeps the removed two thousand banknotes 110 as belonging to one group separately from other banknotes. Specifically, the two thousand banknotes 110 removed from the stacking unit are distinguished from rest of the banknotes by putting those banknotes in the storage container, such as a dedicated basket or bag, or by bundling those banknotes with a rubber band, a tape, and the like. If the grouped banknotes are not to be reused immediately, those banknotes are stored in a safe and the like in the grouped state.

When the number of stacked fit 1000-JPY notes reaches two thousand, which were specified to be grouped in a group, in the stacking unit, the banknote handling apparatus 10 outputs to the management server 20 the serial numbers read from those 2000 banknotes as the serial numbers of the banknotes of one group. The serial numbers are output along with related information. In the management server 20, as shown in FIG. 1, the serial numbers of the two thousand fit 1000-JPY notes of one group are grouped, and those serial numbers are managed as serial number data 20A.

For example, the banknotes grouped in the banknote handling apparatus 10 are reused as the banknotes for the ATM 50. For example, when there is a need to load two thousand fit 1000-JPY notes in the ATM cassette 30, as explained above, it is specified to group two thousand fit 1000-JPY notes in one group in the banknote handling apparatus 10. Accordingly, two thousand fit 1000-JPY notes whose serial numbers are managed by the serial number data 20A can be prepared. Then, when loading those prepared two thousand fit 1000-JPY notes in the ATM cassette 30, the serial number of any one banknote among those two thousand banknotes belonging to one group is read. Based on the read serial number and serial number data 20A and 20B managed in the management server 20, it can be identified that this banknote belongs to a group of banknotes corresponding to the serial number data 20A. Also, the serial numbers of the remaining one thousand nine hundred and ninety nine banknotes can be identified by referring to the serial number data 20A. That is, the serial numbers of all the banknotes belonging to the group can be identified from the serial number of an arbitrary banknote belonging to this group. If storage container information such as a cassette ID for identifying the ATM cassette 30 has been affixed to the ATM cassette 30, the storage container information of the ATM cassette 30 and the serial number data 20A of the banknotes loaded in the ATM cassette 30 can be associated with each other and managed in the management server 20.

Alternatively, the serial numbers of the banknotes can be identified by the ATM 50 instead of identifying the serial numbers when loading the banknotes in the ATM cassette 30. After the grouped two thousand banknotes are put in the ATM cassette 30, the ATM cassette 30 is carried to the installation location of the ATM 50 and mounted to the ATM 50. In the ATM 50, by reading and recording the serial number of one banknote among the two thousand banknotes stored in the ATM cassette 30, the serial numbers of the remaining one thousand nine hundred and ninety nine banknotes can be identified by referring to the serial number data 20A managed in the management server 20. The reading of the serial number in the ATM 50 can be performed in a money dispensing process performed in the ATM 50 after the ATM cassette 30 is set in the ATM 50. Alternatively, the reading of the serial number is performed during an operation check process performed when the ATM cassette 30 is set in the ATM 50. In the operation check process, the banknote(s) are fed from the ATM cassette 30 and stored again in the ATM cassette 30 after reading the serial number(s) of the banknote(s).

Alternatively, while the banknote handling apparatus 10 reads the serial number of each of the banknotes to be grouped, the grouped banknotes are immediately put in the ATM cassette 30 or the banknote storage pouch 41. For example, when preparing one banknote group to be used for dispensing at a teller window of the bank branch office 2 in the banknote handling apparatus 10 installed in the bank head office 1, the banknote processing is started after specifying a plurality of denominations and the numbers of banknotes of each of the specified denominations to be grouped. Upon receiving the specified denominations and the specified numbers of banknotes to be grouped, the banknote handling apparatus 10 feeds, one by one, the banknotes inside the apparatus from the receiving unit, performs recognition and counting of fed banknotes, and reads the serial number of each banknote. When a banknote is a fit note of a specified denomination that can be used at the teller window and the serial number is read from this banknote, the banknote handling apparatus 10 sorts and stacks those banknotes by denomination in the stacking units, while rejecting the banknote of non-specified denomination, the banknote that is of the specified denomination but from which the serial number could not be read, the banknote that is of the specified denomination but that is an unfit note that is not suitable for use in the teller window, and the like. The user removes the banknotes 110 of each of the specified denominations stacked in the stacking unit and puts the removed banknotes in the banknote storage pouch 41. When stacking of the specified number of banknotes of the specified denominations is finished, the banknote handling apparatus 10 outputs to the management server 20 the serial numbers read from those banknotes as the serial numbers of the banknotes of one group. The serial numbers are output along with related information. In the management server 20, as shown in FIG. 1, the serial numbers of the banknotes that have been put in the banknote storage pouch 41 are grouped, and those serial numbers are managed as the serial number data 20B. If the storage container information such as a bag ID for identifying each pouch has been affixed to the banknote storage pouch 41, the bag ID can be associated with the serial number data 20B and managed in the management server 20.

The serial numbers of the banknotes put in the banknote storage pouch 41 can be confirmed later. The banknotes put in the banknote storage pouch 41 are carried to the bank branch office 2. In the bank branch office 2, the serial number of one banknote 111 among the many banknotes taken out from the banknote storage pouch 41 is read, and the serial number is input in the branch server 60. The branch server 60 transmits the input serial number of the banknote 111 to the management server 20, and makes a request for serial number information of a group to which this banknote 111 belongs. Based on the serial number of the banknote 111 received from the branch server 60, the management server 20 identifies the group to which this banknote 111 belongs and transmits to the branch server 60 the serial number data 20B containing the serial numbers of all the banknotes belonging to this group. When this data is received from the management server 20, the branch server 60 stores the received data as serial number data 60A in the branch server 60. In this manner, in the bank branch office 2, the serial numbers of all the banknotes that have been carried to the bank branch office 2 by using the banknote storage pouch 41 can be confirmed from the serial number of one banknote.

Alternatively, the serial number of the one banknote 111 taken out from the banknote storage pouch 41 can be recorded in the branch server 60 of the bank branch office 2 until it is necessary to confirm the serial numbers of the banknotes 110 carried to the bank branch office 2. Only when it is necessary to confirm the serial numbers, the serial number of the banknote 111 can be transmitted to the management server 20 to request the serial number data 20B.

The method to read the serial number of the banknote 111 in the bank branch office 2 is not particularly limited. For example, the serial number of the banknote 111 can be read in a banknote handling apparatus of the bank branch office 2 when the banknotes taken out from the banknote storage pouch 41 are put in the banknote handling apparatus of the bank branch office 2. Alternatively, a clerk of the bank branch office 2 can visually read the serial number of the banknote 111 and input the serial number in the branch server 60. Alternatively, the serial number of the banknote 111 can be read by using a scanner connected to the branch server 60.

In the bank head office 1, for example, as shown in FIG. 1, the money can be separately stored in the two banknote storage pouches 41 and 42 depending on the object of use in the bank branch office 2. Specifically, for example, the banknotes for the banknote handling apparatus of the bank branch office 2 are put in the banknote storage pouch 41, and the banknotes to be used by a teller in the bank branch office 2 are put in the banknote storage pouch 42. In this case, when performing the banknote processing in the banknote handling apparatus 10 is set, so that the banknotes put in the banknote storage pouch 41 are processed as belonging to one group and the banknotes put in the banknote storage pouch 42 are processed as belonging to another group. As a result, the serial number data 20B containing the serial numbers of the banknotes that were put in the banknote storage pouch 41 and serial number data containing the serial numbers of the banknotes that were put in the banknote storage pouch 42 are managed separately in the management server 20.

In the money management system, if there is a need to separately store the banknotes to be carried to the bank branch office 2 in a plurality of storage containers such as the ATM cassette 30 and the banknote storage pouches 41 and 42, it is possible to manage all the banknotes by grouping in one group the serial numbers of all the banknotes put in the plurality of storage containers. Even when separately storing the banknotes of one group in more than one storage containers, the serial numbers of all the banknotes carried to the bank branch office 2, that is, all the banknotes that have been separately stored in more than one storage containers, can be identified in the bank branch office 2 by using the serial number of the one banknote 111 taken out from one of the storage containers. Even when separately storing in the more than one storage containers the many banknotes 110 to be carried to the bank branch office 2, the IDs of the storage containers can be associated with the serial number data 20A (20B) of one group and managed.

In the banknote handling apparatus 10, the stacking units can be divided into two groups depending on an object of use. For example, if there are eight stacking units, four stacking units on the left side are used to stack the banknotes for the ATM 50, and four stacking units on the right side are used to stack the banknotes used for dispensing at the teller window of the bank branch office 2. In this case, in the banknote handling apparatus 10, it is specified to group the banknotes stacked in the four stacking units on the left side in one group, and to group the banknotes stacked in the four stacking units on the right side in a different group.

Specifically, the denomination and the numbers of the banknotes to be stacked in each of the four stacking units on the left side is specified and it is specified to group the serial numbers of these banknotes. Similarly, the denomination and the numbers of the banknotes to be stacked in each of the four stacking units on the right side is specified and it is specified to group the serial numbers of these banknotes. Then, the banknote processing is performed in the banknote handling apparatus 10. Accordingly, in the management server 20, the serial number data 20A containing the serial numbers of the banknotes removed from the four stacking units on the left side and the serial number data 20B containing the serial numbers of the banknotes removed from the four stacking units on the right side are managed separately.

In the money management system, by specifying how to group the banknotes to be processed in the banknote handling apparatus 10, the serial numbers of the banknotes are managed in the management server 20 by grouping the serial numbers in the manner specified by the banknote handling apparatus 10.

Thus, when preparing the banknotes for the ATM 50 or the banknotes for the bank branch office 2, it is not necessary to create a management code associated with a plurality of serial numbers and to print the management code on a management tag or on a bundling tape used to bundle the banknotes. That is, by simply specifying the banknotes to be grouped, a large number of banknotes can be managed by using the serial numbers. When the grouped banknotes have been put in the storage container, the serial numbers of the banknotes put in the storage container can be identified by simply reading the serial number of one banknote selected from among the grouped banknotes.

The banknotes stored in the banknote storage pouches 41 and 42 are not limited to the loose banknotes. The banknote bundle can be stored in the banknote storage pouches 41 and 42. If the banknote handling apparatus 10 has a function to bundle the predetermined number of the banknotes to prepare the banknote bundle, when preparing the banknotes for storage in the banknote storage pouches 41 and 42 with some of the banknote bundle or only the banknote bundle, the banknotes included in the banknote bundle can be managed by grouping by using the above-mentioned method. Specifically, the serial numbers of all the banknotes included in a plurality of banknote bundle can be managed as one group. Alternatively, both the banknotes included in the banknote bundle and the loose banknotes can be managed as one group.

Figure 2:
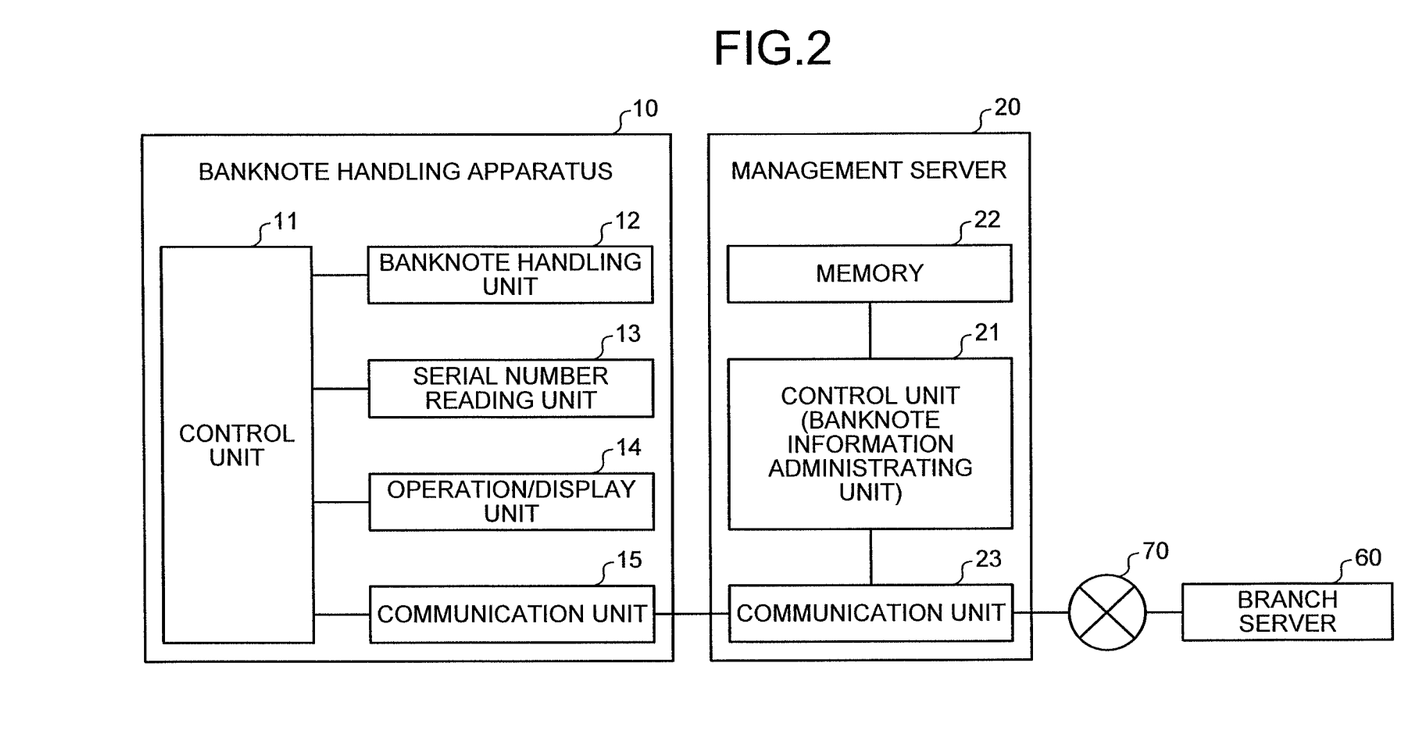
FIG. 2 is a block diagram of each component constituting the money management system.

FIG. 2 is a block diagram of each component constituting the money management system. The banknote handling apparatus 10 includes a banknote handling unit 12, a serial number reading unit 13, an operation/display unit 14, a communication unit 15, and a control unit 11 that controls each unit to realize the functions and the operations described in the present embodiment.

The banknote handling unit 12 has functions to feed the banknotes put on the receiving unit inside the apparatus and recognize and count the banknotes, to stack in the stacking units the banknotes specified previously such as the banknotes for the ATM 50 and the banknotes for the bank branch office 2, and to reject the other banknotes. The serial number reading unit 13 has a function to read the serial number of the banknote to be stacked in the stacking unit. In FIG. 2, the banknote handling unit 12 and the serial number reading unit 13 are shown separately, however, the configuration is not limited to this. That is, it is allowable that a recognition unit included in the banknote handling unit 12 performs both the recognition process to recognize the denomination, the authenticity, and the like of the banknote and the character recognition process to read the serial number of the banknote.

The operation/display unit 14 is constituted by, for example, buttons used to perform a setting operation and an instruction operation, a liquid crystal display to display related information, and the like. The operation/display unit 14 is operated, while confirming the displayed information, to specify the banknotes to be grouped, to set contents of the banknote processing, to give instructions about the banknote processing, and the like. However, the configuration is not limited to the one in which the operation/display unit 14 is included in the banknote handling apparatus 10. It is allowable to provide, separately from the banknote handling apparatus 10, an operation terminal that realizes the functions of the operation/display unit 14.

The communication unit 15 is connected to the management server 20 via a wired or wireless connection and has a function to transmit and receive data with the management server 20. The serial numbers read by the serial number reading unit 13 is transmitted to the management server 20 and managed in a memory 22 in the management server 20.

The management server 20 includes the memory 22 constituted by a nonvolatile hard disk and the like, a communication unit 23 that transmits and receives data with the banknote handling apparatus 10, and a control unit 21 that controls each unit to realize the functions and the operations described in the present embodiment. The control unit 21 of the management server 20 functions as a banknote information managing unit to manage by grouping the serial numbers based on the information received from the banknote handling apparatus 10.

In the bank head office 1, the communication unit 23 of the management server 20 transmits and receives data with the communication unit 15 of the banknote handling apparatus 10 via a network such as a LAN. Moreover, the communication unit 23 can transmits and receives data with an apparatus, such as the branch server 60 of the bank branch office 2, installed outside the bank head office 1. To secure the security and reliability, the data is exchanged between the management server 20 and the apparatuses installed outside the bank head office 1 via a dedicated network 70 built by using the private communication network or the public communication network, such as the Internet, and the like.

Although not shown in FIG. 2, the ATM 50 is also connected to the network 70. Information about the money processing performed in the ATM 50 can be transmitted to the management server 20 via the network 70. A money handling apparatus that recognizes and counts banknotes and coins is used at the installation location of the ATM 50. By connecting such money handling apparatus and the ATM 50 to each other, data can be exchanged between the money handling apparatus and the management server 20 via the ATM 50.

For example, the banknotes to be used in the ATM 50 installed in a retail shop are put in the ATM cassette 30, and the banknotes to be used in the shop are put in the banknote storage pouch 41 in the bank head office 1, and the ATM cassette 30 and the banknote storage pouch 41 are carried to the shop in which a banknote counting apparatus is installed. Unlike the bank branch office 2, the shop does not have the authorities for using the network 70 built for the bank, and therefore the shop cannot receive data directly from the management server 20. In this case, the banknote counting apparatus installed in the shop is connected to the ATM 50, and information such as the serial number of the banknote acquired by the banknote counting apparatus is transmitted to the management server 20 via the ATM 50. When the serial number data 20A and 20B managed in the management server 20 are required in the shop, the banknote counting apparatus receives such data from the management server 20 via the ATM 50. Moreover, information about the banknote counting apparatus being used in the shop and information about the banknote processing performed in the banknote counting apparatus can be transmitted to the management server 20 via the ATM 50. Accordingly, the banknote counting apparatus installed in the shop can be managed by using the management server 20.

Figure 3A:
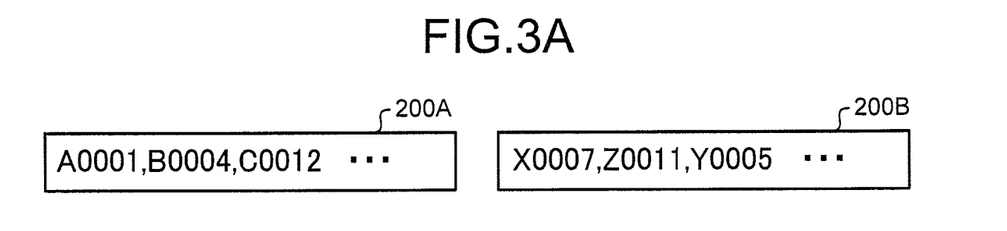
FIGS. 3A and 3B are views depicting examples of a serial number managed in a management server.
Figure 3B:
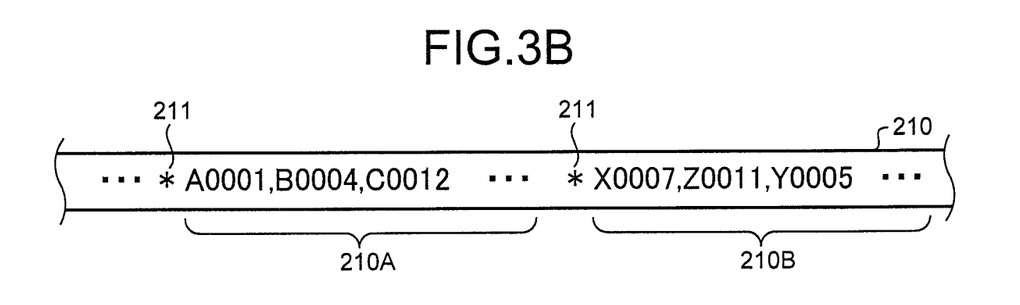

FIGS. 3A and 3B are views depicting examples of the serial number data 20A and 20B managed in the management server 20. In the management server 20, as shown in FIG. 3A, the grouped serial numbers are managed as one data file. Specifically, the serial number data 20A shown in FIG. 1 is managed as one data file 200A as shown in FIG. 3A, and the serial number data 20B is managed as another data file 200B. In each of the data files 200A and 200B, the serial numbers are separated by a character used as a serial number separator such as a comma. Accordingly, the serial numbers of all the banknotes belonging to each group can be identified.

Alternatively, in the management server 20, the serial number of a plurality of groups can be managed as one data file 210 as shown in FIG. 3B. In this case, the serial numbers are separated by the serial number separator such as a comma, and the groups are separated by a character used as a group separator 211 such as an asterisk different from the comma. As a result, a data aggregate 210A containing the serial number data 20A shown in FIG. 1 and a data aggregate 210B containing the serial number data 20B can be managed in one data file 210.

The grouped serial numbers and the storage container information indicating the storage container, in which the grouped banknotes are stored, can be managed in the management server 20. For example, assume that the grouped banknotes whose serial numbers are groped as in the serial number data 20A shown in FIG. 1 are stored in the ATM cassette 30. If the storage container information such as the cassette ID to identify this cassette has been affixed to the ATM cassette 30, this cassette ID is managed along with the serial number data 20A. Similarly, for example, assume that the grouped banknotes whose serial numbers are grouped as in the serial number data 20B are stored in the banknote storage pouch 41. If the storage container information such as the bag ID to identify this banknote storage pouch 41 has been affixed to the banknote storage pouch 41, this bag ID is managed along with the serial number data 20B. Specifically, the storage container information is added in a header or a footer of the data files 200A and 200B shown in FIG. 3A, or in a header or a footer of the data aggregates 210A and 210B shown in FIG. 3B. As a result, when there is a requirement to identify the serial numbers of all the banknotes stored in the ATM cassette 30 and the banknote storage pouches 41 and 42, in addition to using the serial numbers of the stored banknotes, it is possible to identify the serial numbers of all the grouped banknotes based on the storage container information.

Thus, only the data of the serial numbers can be managed by grouping in the management server 20. Alternatively, it is allowable to group the serial numbers of the banknotes put in the storage containers such as the ATM cassette 30 and the banknote storage pouches 41 and 42, and manage the serial numbers along with the storage container information to identify the storage container.

Figure 4:
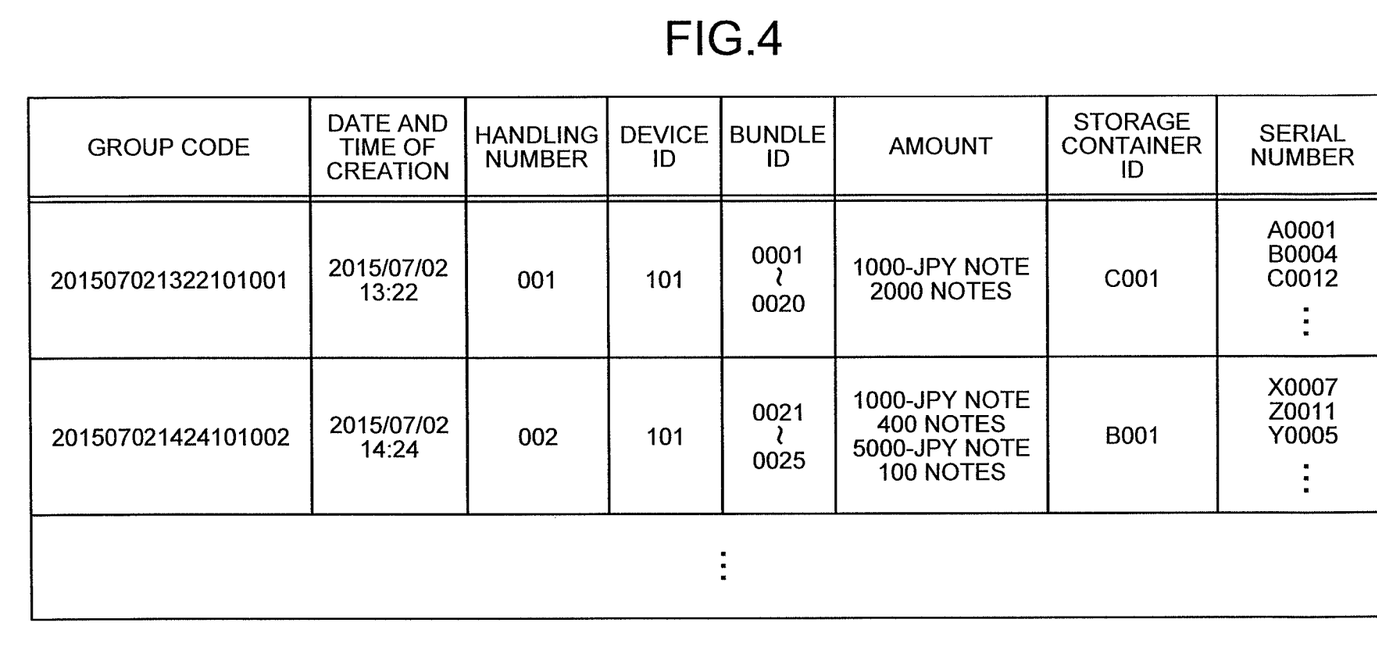
FIG. 4 is a view depicting an example of a serial number of a banknote and information about the banknote both managed in the management server.

In addition, it is possible to manage in the management server 20 the information about the banknote processing along with the grouped serial numbers. FIG. 4 is a view depicting an example of the serial numbers of the banknotes and the information about the banknotes both managed in the management server 20. The data managed in the management server 20 includes a group code, a date and time when the group code is created, a handling number of the banknote processing by which the banknotes managed with the group code are processed, an apparatus ID indicating the banknote handling apparatus 10 that processed the banknotes, bundle ID representing consecutive numbers given to banknote bundles created in the banknote handling apparatus 10, amount information ("amount" in FIG. 4) including the denominations, the numbers, and the like of banknotes by which it is possible to calculate the total amount of the banknotes of one group, a storage container ID (storage container information) to identify the storage container in which the banknotes of one group is stored, and the serial numbers of the banknotes belonging to one group. In the example shown in FIG. 4, the denomination information has been shown in the column "amount"; however, information about fitness and the like can be added to the information to be managed in this column. The bundle ID is a consecutive number allocated to distinguish each bundle of banknotes such as, the banknotes bundled by the bundling tape, the banknotes the number of which is the batch number, the banknotes removed from the stacking unit which became full, and the like.

The data shown in the upper row in FIG. 4 represents an example of the banknote processing having the handling number "001" performed in the banknote handling apparatus 10 having the apparatus ID "101". This data indicates that total two thousand banknotes, which are twenty bundles of one hundred 1000-JPY notes having the bundle IDs "0001" to "0020", are grouped and stored into the ATM cassette 30 having the cassette ID "0001", and the serial numbers of the banknotes belonging to this group is "A0001", and the like. Moreover, the data shown in the lower row in FIG. 4 represents an example of the banknote processing having the handling number "002" performed in the same banknote handling apparatus 10. This data indicates that total five hundred banknotes, which are four bundles of one hundred 1000-JPY notes and one bundle of one hundred 5000-JPY notes having the bundle IDs "0021" to "0025", are grouped and stored into the banknote storage pouch 41 having the bag ID "5001", and the serial numbers of the banknotes belonging to this group is "X0007", and the like.

The group code is created such that all of the bundle of loose banknotes and the banknote bundle wrapped by the bundling tape created by using a plurality of the banknote handling apparatuses 10 in the bank head office 1 can be distinguished. For example, as shown in FIG. 4, the group code is created by combining numbers indicating the date and time of creation, the apparatus ID, and the handling number.

As shown in FIG. 4, by managing in the management server 20 the serial numbers of all the grouped banknotes and the information related to the grouped banknotes, the processing contents and the like of the banknote processing when grouped banknotes were prepared in the bank head office 1 can be confirmed. Whether the data managed in the management server 20 should contain only the serial numbers as shown in FIGS. 3A and 3B, should also contain the storage container information, or should contain the information about the banknotes as shown in FIG. 4, can be changed as desired by changing the setting. Moreover, the information to be managed by storing along with the serial numbers as shown in FIG. 4 can be selected as desired by changing the setting. For example, only the serial number information and the amount information can be managed.

Figure 5A:
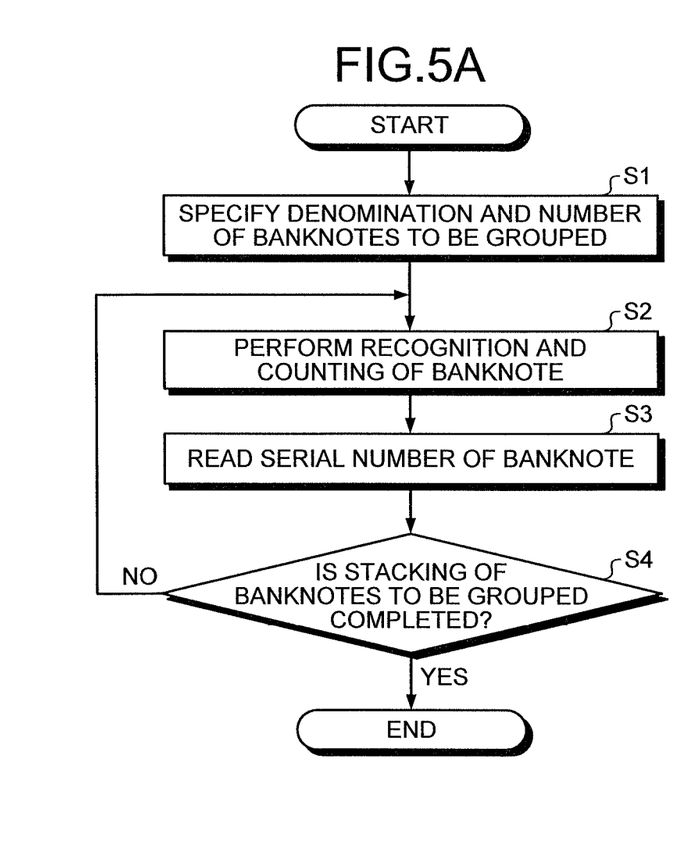
FIGS. 5A and 5B are flowcharts for explaining a method of specifying the banknotes to be grouped in a banknote handling apparatus.
Figure 5B:
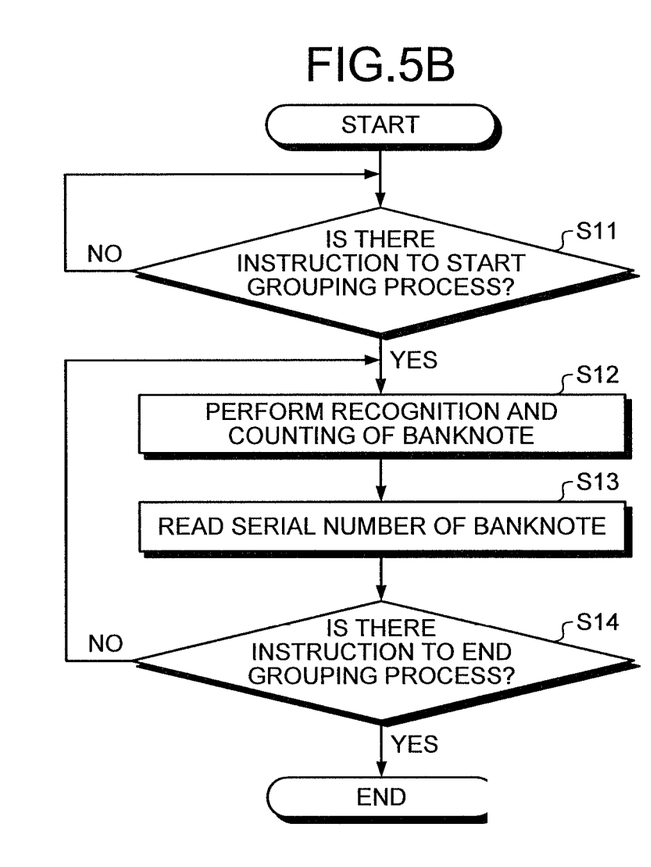

A method of specifying the banknotes to be grouped is explained below. FIGS. 5A and 5B are flowcharts for explaining a method of specifying the banknotes to be grouped in the banknote handling apparatus 10. FIG. 5A shows a specifying method performed when the denominations and the numbers of banknotes to be grouped are previously fixed, and FIG. 5B shows a specifying method when the denominations and the numbers of banknotes to be grouped are not fixed.

For example, like when putting the banknotes in the ATM cassette 30, if the type and the number of the banknotes to be put in the cassette is previously fixed, the type, such as the denomination and the fitness, and the number of the banknotes to be grouped are specified by operating the operation/display unit 14 of the banknote handling apparatus 10 as shown in FIG. 5A (Step S1). Then, in the banknote handling apparatus 10, the banknote processing is started. In the banknote processing, banknotes are recognized and counted, and the specified number of banknotes, which are fit notes of the specified denominations and suitable for use in the ATM 50, are stacked in the stacking units.

Specifically, in the banknote handling apparatus 10, the banknote handling unit 12 performs the recognition and counting of the banknotes fed one by one from the receiving unit in the apparatus (Step S2), and the serial number reading unit 13 reads the serial number of the banknotes (Step S3) and the banknotes are stacked in the stacking units.

The banknote handling apparatus 10, for example, performs the batch processing in which a predetermined number of the banknotes (for example, 100) of the type that are to be grouped are stacked in the stacking unit. The user of the banknote handling apparatus 10, whenever one hundred banknotes equal to the batch number are stacked in one of the stacking units, repeats the operation of removing those stacked banknotes from this stacking unit.

In the banknote handling apparatus 10, the stacking of the banknotes in the stacking unit is stopped when one hundred banknotes equal to the batch number are stacked in the stacking unit. This stacking unit is again used for stacking of the banknotes after it is detected that the stacked banknotes have been removed from the stacking unit. If a plurality of stacking units is to be used for stacking the same type of banknotes, the stacking of the banknotes in a certain stacking unit is stopped when one hundred banknotes are stacked in the stacking unit, and the stacking of the banknotes is started in another stacking unit. However, the banknote processing for preparing the banknotes to be grouped is not limited to the batch processing. For example, the stacking of the banknote can be continued until the stacking unit becomes full.

Until completion of the stacking of the specified number of the banknotes of the type to be grouped in the stacking unit (Step S4: No), the banknote handling apparatus 10 repeats the recognition and counting of the banknotes and the reading of the serial number of the banknotes. When the stacking of the specified number of the banknotes in the stacking unit is completed (Step S4: Yes), the process is finished.

When the recognition and counting of the banknotes to be grouped and the reading of the serial numbers of all the banknotes to be grouped is finished, the control unit 11 of the banknote handling apparatus 10 transmits the serial numbers of all the banknotes to be grouped to the management server 20 via the communication unit 15. The management server 20 groups, as shown in FIGS. 3A and 3B or FIG. 4, the serial numbers received from the banknote handling apparatus 10, and manages the grouped serial numbers in the memory 22.

In this manner, the specified number of banknotes of the specified type specified previously to be grouped can be stacked in the stacking units of the banknote handling apparatus 10, and the serial numbers of all the banknotes stacked in the stacking units can be grouped and managed in the management server 20.

Alternatively, for example, when there is a requirement to group by denomination the banknotes which were collected in the bank head office 1 from a retail shop and whose denominations and numbers are unclear, the user of the banknote handling apparatus 10 operates the operation/display unit 14 as shown in FIG. 5B. The user instructs a grouping process for grouping the banknotes, which are inserted into the banknote handling apparatus 10, by denomination (Step S11: Yes) whereby the grouping processing is started. Until there is an instruction to start the grouping process (Step S11: No), the conventional banknote processing is performed without performing the process relating to the grouping of banknotes.

When the banknotes collected from the shop are put in the receiving unit and the grouping process is started, in the banknote handling apparatus 10, the banknote handling unit 12 performs the recognition and counting of the banknotes fed one by one from the receiving unit in the apparatus (Step S12), the serial number reading unit 13 reads the serial number of each of the banknotes (Step S13) and the banknotes are stacked in different stacking units depending on the denominations. Until all the banknotes put in the receiving unit are recognized, counted and stacked in the stacking units, the process of recognition and counting, the reading of the serial number, and the sorting of the banknotes by denomination are repeated (Step S14: No). When the stacking of the banknotes in the stacking unit is stopped because the stacking unit has become full, the stacking of the banknotes in this stacking unit is restarted after the user removes the stacked banknote from this stacking unit. The user manages the grouped banknotes in a mass, which are removed from the same stacking unit, by putting the banknotes in the storage container such as a dedicated basket or pouch, or by bundling the banknotes by using a rubber band or a tape. In the banknote handling apparatus 10, when the recognition and counting and the stacking in the stacking units of all the processing target banknotes is completed, the user operates the operation/display unit 14 and instructs the end of the grouping process (Step S14: Yes), and the grouping process is finished.

When the grouping process of the banknotes is finished, the control unit 11 of the banknote handling apparatus 10 collectively transmits the serial numbers of all the banknotes by group to the management server 20 via the communication unit 15. Because it is specified to group the banknotes by denomination, the serial numbers are grouped by denomination of the banknotes. The management server 20 groups, as shown in FIGS. 3A and 3B or FIG. 4, the serial numbers received from the banknote handling apparatus 10, and manages the grouped serial numbers in the memory 22.

In this manner, by specifying only the type of the banknotes to be grouped, the banknotes of the specified type can be stacked in the stacking units of the banknote handling apparatus 10, and the serial numbers of all the banknotes stacked in the stacking units can be grouped and managed in the management server 20.

Alternatively, it is allowable not to specify any of the type and the number of the banknotes. That is, all the banknotes whose serial numbers are read in the banknote handling apparatus 10 within a time period are grouped and managed in the management server 20. The time period is set from a start time point at which the start of the grouping process is instructed to an end time point at which the end of the grouping process is instructed. Specifically, after the instruction to start the grouping process is received, all the banknotes that need to be grouped are processed in the banknote handling apparatus 10. After finishing the processing of all banknotes, when the instruction to end the grouping process is received, the banknote handling apparatus 10 transmits to the management server 20 via the communication unit 15 the serial numbers of the banknotes read within the time period from the start time point when receiving the start instruction of the grouping process to the end time point when receiving the end instruction of the grouping process. The management server 20 groups, as shown in FIGS. 3A and 3B or FIG. 4, the serial numbers received from the banknote handling apparatus 10, and manages the grouped serial numbers in the memory 22.

Figure 6:
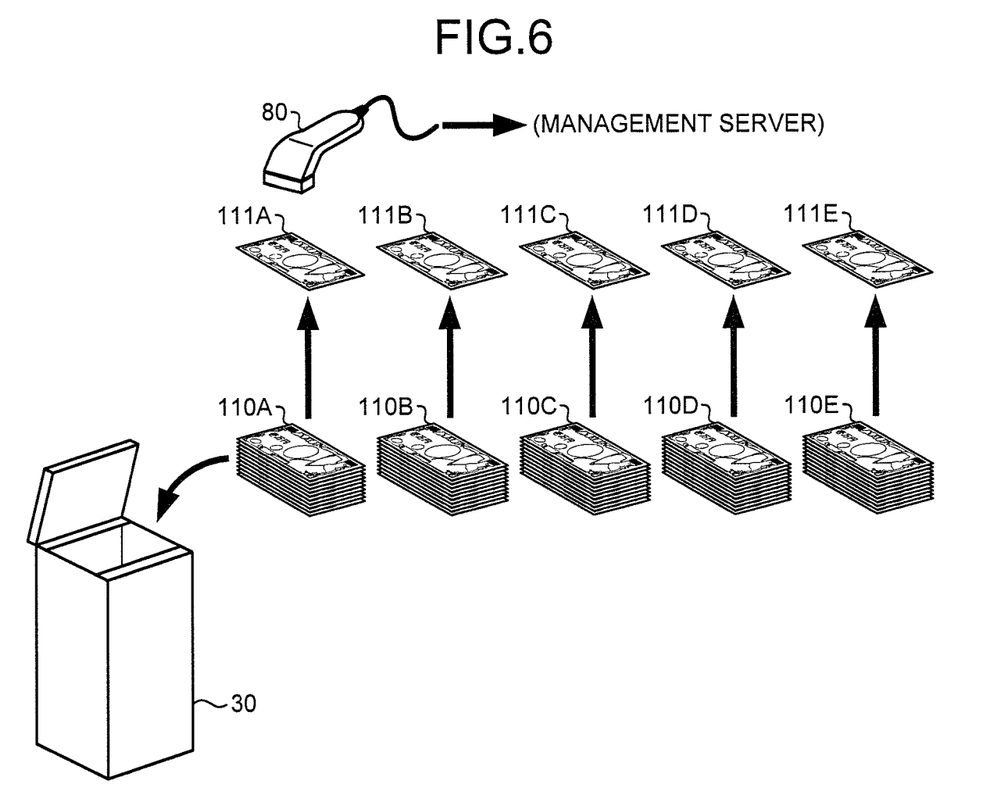
FIG. 6 is a schematic diagram for explaining a method of regrouping in one group banknote bundles that were already grouped.

In the money management system, the banknotes that were already grouped in a plurality of groups can be regrouped in one group. FIG. 6 is a schematic diagram for explaining a method of regrouping in one group bundles of banknotes 110A to 110E each of which were already grouped. For example, assume that the five already grouped bundles of banknotes 110A to 110E each containing 400 banknotes are to be put in the ATM cassette 30. In this case, five banknotes 111A to 111E are pulled out from each bundles of banknotes 110A to 110E. The serial number of each of five banknotes 111A to 111E is read by using a handy scanner 80, and the read serial numbers are input into the management server 20. Based on the five serial numbers input by using the scanner 80, the management server 20 regroups in one group the serial numbers belonging to the five bundles of banknotes 110A to 110E. As a result, the serial numbers of total two thousand banknotes to be stored in the ATM cassette 30 can be managed by grouping in one group.

When regrouping the existing groups, the method of specifying the groups to be regrouped is not limited to the method of inputting by using the scanner 80 the serial numbers of the banknotes 111A to 111E contained in each group. For example, the user visually reads the serial numbers of the banknotes 111A to 111E and manually inputs the serial numbers. Alternatively, it is possible to directly specify in the management server 20 the bundles of banknotes 110A to 110E to be regrouped. Moreover, it is not limited to directly input the data into the management server 20, or directly operate the management server 20. For example, the serial numbers of the banknotes 111A to 111E included in the groups to be regrouped or the information to specify the bundles of banknotes 110A to 110E can be input into the management server 20 via the banknote handling apparatus 10 connected to the management server 20, or via a scanner connected to another terminal.

As has been explained above, with the money management system and the money management method according to the present embodiment, it is possible to manage by grouping the banknotes prepared for the ATM 50 and stored in the ATM cassette 30, and the banknotes prepared for the bank branch office 2 or the retail shop and stored in the banknote storage pouches 41 and 42. Because the serial numbers read from the banknotes are managed by grouping, it is not necessary to create a management code to be associated with each of the serial numbers, but the banknotes belonging to each of the groups can be managed by using only the data of the read serial numbers. Moreover, because there is no need to print information such as a management code on a management tag, and affix the management tag to the banknote bundle, or print information such as a management code on a bundling tape of the banknote bundle, the grouped banknotes can be managed easily.

Also, there is no limitation on the number of the banknotes to be grouped. Therefore, even if there are a large number of banknotes that are to be separately stored in the plurality of the banknote storage pouches 41 and 42, or there are a large number of the banknotes included in a plurality of banknote bundles, all the banknotes can be managed by grouping in one group.

When identifying the group to which the banknote belongs, one banknote belonging to the group is pulled out and the serial number of this banknote is read. Thus, all the serial numbers grouped with this serial number can be identified. Even if the banknotes are randomly stored in a bag, the grouped banknotes can be identified easily only by pulling out one banknote from the bag, and reading the serial number of this banknote. Even if the banknotes are wrapped by a bundling tape, all the banknotes contained in the banknote bundle can be identified easily by reading the serial number of only one topmost or bottommost banknote among the banknotes contained in the banknote bundle without unwrapping the bundling tape of the banknote bundle.

INDUSTRIAL APPLICABILITY

As explained above, the money management system and the money management method according to the present invention are useful in managing by grouping a large number of banknotes.

EXPLANATION OF REFERENCE NUMERALS

10 Banknote handling apparatus
11 Control unit
12 Banknote handling unit
13 Serial number reading unit
14 Operation/display unit
15, 23 Communication unit
20 Management server
21 Control unit (banknote information managing unit)
22 Memory
30 ATM cassette
41, 42 Banknote storage pouch
60 Branch server 70 Network
80 Scanner

The invention claimed is:

1. A money management system comprising:
a serial number reading unit that reads a serial number of each banknote to be grouped; and
a control unit that forms a group including a plurality of serial numbers read by the serial number reading unit to manage the plurality of serial numbers, receives an input of a target serial number, identifies a target group including the target serial number from among groups and identifies serial numbers of all banknotes belonging to the target group.

2. The money management system as claimed in claim 1, wherein
the control unit associates a group code with the plurality of serial numbers of the banknotes to be grouped to manage the plurality of serial numbers, receives an input of a target group code, identifies the target group code from among the groups, and identifies all the serial numbers associated with the target group code.

3. The money management system as claimed in claim 1, further comprising:
an operation unit by which the banknotes to be grouped are input; and
a banknote handling unit that performs recognition and counting of the banknotes to be grouped, wherein
when a denomination and a number of banknotes, whose serial numbers are to be grouped, are input by using the operation unit,
the banknote handling unit determines whether each of the banknotes are to belong to an input group,
the serial number reading unit reads the serial numbers of the banknotes determined to belong to the input group, and
the control unit groups the serial numbers read by the serial number reading unit.

4. The money management system as claimed in claim 1, further comprising:
an operation unit by which the banknotes to be grouped are input, wherein
when an instruction to start a grouping process and an instruction to end the grouping process are input by using the operation unit,
the control unit groups the plurality of serial numbers read by the serial number reading unit within a time period from a time point at which an instruction to start the grouping process is received to a time point at which an instruction to end the grouping process is received.

5. The money management system as claimed in claim 1, wherein
the control unit associates the plurality of serial numbers of grouped banknotes with storage container information indicating a storage container in which the grouped banknotes are stored.

6. A money management system comprising:
a banknote handling apparatus that performs recognition and counting of each banknote to be grouped and reads a serial number of each banknote to be grouped; and
a management server that
acquires from the banknote handling apparatus serial numbers read by the banknote handling apparatus and manages received serial numbers by group,
receives an input of a target serial number of one banknote in a group of banknotes prepared for storage in a banknote storage container,
identifies a target group including the target serial number from among managed groups, and
identifies serial numbers of all banknotes for storage in the banknote storage container.

7. A money management method comprising:
reading by a banknote handling apparatus a serial number of each banknote to be grouped;
managing the serial numbers, by a management server, by grouping a plurality of serial numbers;
inputting a target serial number in the management server;
identifying a target group including the target serial number from among groups managed in the management server; and
identifying serial numbers of all banknotes belonging to the target group.

8. The money management method as claimed in claim 7, wherein the target serial number of one banknote in a group of banknotes prepared for storage in a banknote storage container is input in the management server; and
the management server identifies a target group containing the target serial number from among groups managed in the management server; and
serial numbers of all banknotes for storage in the banknote storage container.

* * * * *